(12) United States Patent
Gonion

(10) Patent No.: US 9,632,775 B2
(45) Date of Patent: Apr. 25, 2017

(54) COMPLETION TIME PREDICTION FOR VECTOR INSTRUCTIONS

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 435 days.

(21) Appl. No.: 14/177,399

(22) Filed: Feb. 11, 2014

(65) Prior Publication Data

US 2015/0227369 A1    Aug. 13, 2015

(51) Int. Cl.
*G06F 9/30* (2006.01)
*G06F 9/345* (2006.01)
*G06F 9/38* (2006.01)
*G06F 3/00* (2006.01)

(52) U.S. Cl.
CPC ...... *G06F 9/30036* (2013.01); *G06F 9/30043* (2013.01); *G06F 9/345* (2013.01); *G06F 9/3824* (2013.01); *G06F 9/3836* (2013.01)

(58) Field of Classification Search
None
See application file for complete search history.

(56) References Cited

U.S. PATENT DOCUMENTS

| | | |
|---|---|---|
| 5,539,902 A | 7/1996 | Sakai |
| 6,247,094 B1 | 6/2001 | Kumar |
| 6,513,110 B1 | 1/2003 | Keppel et al. |
| 6,625,727 B1 | 9/2003 | Moyer |
| 6,725,337 B1 | 4/2004 | Tan |
| 7,395,419 B1 | 7/2008 | Gonion |
| 7,617,496 B2 | 11/2009 | Gonion |
| 7,620,797 B2 | 11/2009 | Gonion et al. |
| 7,624,251 B2 | 11/2009 | Gonion et al. |
| 7,739,442 B2 | 6/2010 | Gonion |
| 7,975,134 B2 | 7/2011 | Gonion |
| 8,019,976 B2 | 9/2011 | Gonion et al. |
| 8,019,977 B2 | 9/2011 | Gonion et al. |
| 8,060,728 B2 | 11/2011 | Gonion et al. |
| 8,078,847 B2 | 12/2011 | Gonion et al. |
| 8,131,979 B2 | 3/2012 | Gonion et al. |
| 8,176,299 B2 | 5/2012 | Gonion et al. |
| 8,181,001 B2 | 5/2012 | Gonion et al. |
| 8,271,832 B2 | 9/2012 | Gonion et al. |
| 8,356,159 B2 | 1/2013 | Gonion et al. |
| 8,356,164 B2 | 1/2013 | Gonion et al. |
| 8,359,460 B2 | 1/2013 | Gonion et al. |
| 8,359,461 B2 | 1/2013 | Gonion et al. |

(Continued)

OTHER PUBLICATIONS

Office Action, U.S. Appl. No. 14/177,378, filed Feb. 11, 2014, mailed Mar. 18, 2016, 24 pages.

(Continued)

*Primary Examiner* — Scott Sun

(74) *Attorney, Agent, or Firm* — Meyertons, Hood, Kivlin, Kowert & Goetzel, P.C.; Lawrence J. Merkel

(57) ABSTRACT

In an embodiment, a processor may include a completion time prediction circuit. The completion time prediction circuit may be configured to track one or more aspects of previous instances of a vector memory operation, and may be configured to predict a completion time for a current instance of the vector memory operation. The prediction may be used by the issue circuit to schedule operations dependent on the vector memory operation, if any.

20 Claims, 11 Drawing Sheets

(56) References Cited

U.S. PATENT DOCUMENTS

| | | |
|---|---|---|
| 8,364,938 B2 | 1/2013 | Gonion et al. |
| 8,370,608 B2 | 2/2013 | Gonion et al. |
| 8,402,255 B2 | 3/2013 | Gonion et al. |
| 8,412,914 B2 | 4/2013 | Gonion |
| 8,417,921 B2 | 4/2013 | Gonion et al. |
| 8,447,956 B2 | 5/2013 | Gonion et al. |
| 8,464,031 B2 | 6/2013 | Gonion |
| 8,484,407 B2 | 7/2013 | Haukness |
| 8,484,443 B2 | 7/2013 | Gonion |
| 8,504,806 B2 | 8/2013 | Gonion |
| 8,527,737 B2 | 9/2013 | Gonion |
| 8,527,742 B2 | 9/2013 | Gonion |
| 8,539,205 B2 | 9/2013 | Gonion |
| 9,442,734 B2 | 9/2016 | Gonion |
| 2004/0193837 A1 | 9/2004 | Devaney |
| 2006/0174228 A1* | 8/2006 | Radhakrishnan ... G06F 9/30047 717/127 |
| 2009/0083744 A1* | 3/2009 | Shimada ............... G06F 9/4843 718/102 |
| 2009/0228682 A1* | 9/2009 | Mejdrich ............ G06F 9/30032 712/7 |
| 2012/0297139 A1 | 11/2012 | Choi |

OTHER PUBLICATIONS

U.S. Appl. No. 14/177,378, filed Feb. 11, 2014, Jeffry E. Gonion.

* cited by examiner

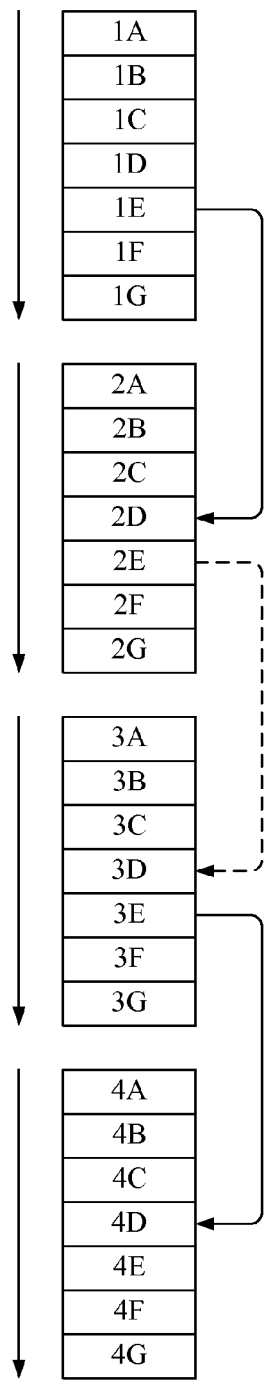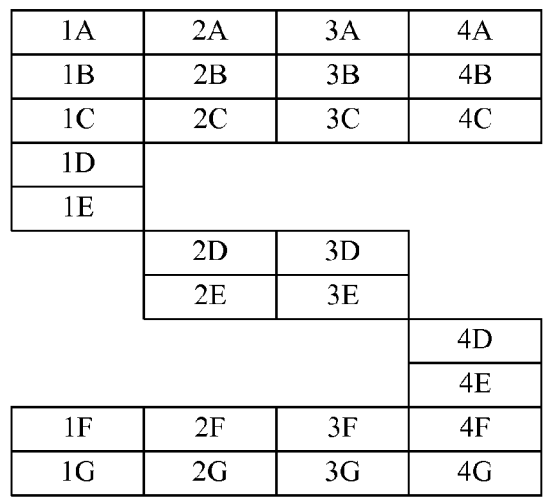
Fig. 10

| | | | | |
|---|---|---|---|---|
| x = 0, | A[x] = 1, | r = 1, | s = 0, | B[x] = 1 |
| x = 1, | A[x] = 10, | r = 1, | s = 16, | B[x] = 17 |
| x = 2, | A[x] = 16, | r = 1, | s = 16, | B[x] = 17 |
| x = 3, | A[x] = 16, | r = 1, | s = 26, | B[x] = 27 |
| x = 4, | A[x] = 26, | r = 1, | s = 29, | B[x] = 30 |
| x = 5, | A[x] = 29, | r = 1, | s = 9, | B[x] = 10 |
| x = 7, | A[x] = 9, | r = 13, | s = 9, | B[x] = 22 |
| x = 7, | A[x] = 1, | r = 0, | s = 9, | B[x] = 9 |
| x = 8, | A[x] = 20, | r = 0, | s = 20, | B[x] = 20 |
| x = 9, | A[x] = 0, | r = 17, | s = 20, | B[x] = 37 |
| x = 10, | A[x] = 16, | r = 17, | s = 9, | B[x] = 26 |
| x = 11, | A[x] = 14, | r = 17, | s = 1, | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

Fig. 11A

| x | = | 0 | 1 | 2 | 3 | 4 | 5 | 6 | 7 |
|---|---|---|---|---|---|---|---|---|---|
| A[x] | = | 1 | 10 | 16 | 16 | 26 | 29 | 9 | 1 |
| r = A[x+s] | = | 1 | | | | | | | |
| s = A[x+r] | = | | 16 | 16 | 26 | 29 | 9 | | |
| r = A[x+s] | = | | | | | | | 13 | 0 |
| B[x] | = | 1 | 17 | 17 | 27 | 30 | 10 | 22 | 9 |

| x | = | 8 | 9 | 10 | 11 | 12 | 13 | 14 | 15 |
|---|---|---|---|---|---|---|---|---|---|
| A[x] | = | 20 | 0 | 16 | 14 | 20 | 14 | 22 | 13 |
| s = A[x+r] | = | 20 | | | | | | | |
| r = A[x+s] | = | | 17 | | | | | | |
| s = A[x+r] | = | | | 9 | 1 | 17 | 19 | 15 | 30 |
| B[x] | = | 20 | 37 | 26 | 18 | 34 | 36 | 32 | 47 |

Fig. 11B

Source Code

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

Fig. 12A

Vectorized Code

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

Fig. 12B

Example 2A
Vectorized
(Non-Speculative)

```
       j = 0;
       x = VectorIndex (0,1) ;
       goto Loop1Tail;
   Loop1:
       p3 = 0;
       j = PropagatePriorF (j, p0) ;
       ~p0; t = VectorReadInt (A, x) ;
       p1 = t < FACTOR;
       p2 = ConditionalStop (p1, kTT | kTF) ;
   Loop2:
       t = x + j ;
       !p0; p3 = GeneratePredicates (p3, p2) ;
       ~p3; t = VectorTest (p1) ;
       if ( NONE () ) goto Loop2Tail ;
       !p3; p4 = p1 + 0;
       ~p4; j = VectorRead (A, t) ;
       j = PropagatePostT (j, j, p4) ;
   Loop2Tail:
       if ( !CARRY () ) goto Loop2
       ~p0; VectorWrite (B, x, j) ;
       x += VECLEN;
   Loop1Tail:
       p0 = (x < KSIZE) ;
       if ( FIRST () ) goto Loop1;
```

Fig. 13A

Example 2B
Vectorized
(Speculative)

```
       j = 0;
       x = VectorIndex (0,1) ;
       goto Loop1Tail ;
   Loop1:
       p3 = 0 ;
       j = PropagatePriorF (j, p0) ;
   Loop2:
       !p0; p5 = Remaining (p3) ;
       ~p5; t = x + j ;
       ~p5; t = VectorReadIntFF (A, t, ps) ;
       ~p5; p5 &= ps ;
       ~p5; p1 (t < FACTOR) ;
       !p5; i2 = ConditionalStop (p1, kTT | kTF) ;
       !p0; p3 = GeneratePredicates (p3, i2) ;
       ~p3; VectorTest (p1) ;
       ~p3; if (NONE () ) goto Loop2Tail ;
       !p3; p4 = p1 + 0 ;
       ~p4; j = VectorRead (A, x) ;
       j = PropagatePostT (j, j, p4) ;
   Loop2Tail:
       ~p0; VectorTest (p3) ;
       if ( !LAST () ) goto Loop2 ;
       ~p0; VectorWrite (B, x, j) ;
       x += VECLEN ;
   Loop1Tail:
       p0 = (x < KSIZE) ;
       if ( FIRST () ) goto Loop1 ;
```

Fig. 13B

Example 3
Vectorized

```
            x = VectorIndex (0,1) ;
            goto Loop1Tail ;
        Loop1:
            ~p0; r = VectorReadInt(C,x);
            ~p0; s = VectorReadInt (D, x) ;
            i1 = CheckHazardP(r,x,p0);
            i2 = CheckHazardP(s,x,p0);
            i3 = VectorMax(i1,i2);
            p4 = 0 ;
        Loop2:
            ~p0; p4 = GeneratePredicates (p4, i3) ;
            ~p4; t1 = VectorReadInt(A,r) ;
            ~p4; t2 = VectorReadInt(A,s);
            ~p4; t3 = t1 + t2 ;
            ~p4; VectorWriteInt(A,x,t3);
            ~p0; if (!CARRY( )) goto Loop2;
            x += VECLEN;
        Loop1Tail:
            p0 = (x < KSIZE) ;
            if ( FIRST (p0) ) goto Loop1 ;
```

Fig. 14

Example 4
Vectorized

```
        x = VectorIndex (0,1) ;
        goto Loop1Tail ;
Loop1:
    j = PropagatePriorF(j,p0);
    ~p0; f = VectorReadInt(A,x);
    ~p0; g = VectorReadInt (B, x) ;
    !p0; p1 = (f < FACTOR);
    !p0; p2 = (g < FACTOR);
    ~p1; h = VectorReadInt(C,x);
    ~p2; i = VectorReadInt(D,x);
    !p1; ix = CheckHazardP(h,i,p2);
    p3 = 0 ;
Loop2:
    p3 = GeneratePredicates (p3, ix) ;
    !p3; p4 = p1 + 0;
    !p3; p5 = p2 + 0;
    ~p4; j = VectorReadInt(E,h);
    j = CopyPropagate(j,j,p4);
    ~p5; VectorWriteInt(E,i,j);
    ~p0; if (!LAST(p3)) goto Loop2;
    x += VECLEN;
Loop1Tail:
    p0 = (x < KSIZE) ;
    if ( FIRST (p0) ) goto Loop1 ;
```

Fig. 15

COMPLETION TIME PREDICTION FOR VECTOR INSTRUCTIONS

BACKGROUND

Field of the Invention

This invention is related to the field of processors and, more particularly, to processors that execute predicated vector operations.

Description of the Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

Vector memory operations can be used to read/write vector data to/from vector registers in a DLP processor. Particularly, one DLP architecture permits vector elements to be stored in non-consecutive memory locations (i.e. non-consecutive addresses). In such an architecture, vector reads can gather the vector elements from dispersed memory locations into a vector register, and vector writes can disperse the vector elements from the vector register to disparate memory locations. Vector reads are generated responsive to vector load instructions, and vector writes are generated responsive to vector store instructions, respectively.

Supporting the above vector loads and stores can simplify the transition to vector code, since data need not be moved from its original locations to be vectorized. However, the above vector loads and stores can present challenges to efficient instruction scheduling and execution. Generally, issue circuitry attempts to schedule a given dependent operation based on the completion of the previous operation on which the given dependent operation depends. That is, the given dependent operation is scheduled to arrive at a pipeline stage at which operands are forwarded at the same time that the result of the previous operation is forwarded. For non-vector loads and stores, the number of cache access, translation lookaside buffer (TLB) accesses, etc. are known and thus the time at which the operation will complete is known. However, a variable number of cache accesses and/or translations may be used to execute a given vector load or store. Thus, the completion time is unknown at the time the given vector load/store is issued.

SUMMARY

In an embodiment, a processor may include a completion time prediction circuit. The completion time prediction circuit may be configured to track one or more aspects of previous instances of a vector memory operation, and may be configured to predict a completion time for a current instance of the vector memory operation. The prediction may be used by the issue circuit to schedule operations dependent on the vector memory operation, if any. The dependent operations may be scheduled and issued to align with the forwarding of data from a vector load memory operation (or to align with the availability of store data for a vector store memory operation). In some embodiments, performance may be increased via the more efficient scheduling of memory operations.

BRIEF DESCRIPTION OF THE DRAWINGS

The following detailed description makes reference to the accompanying drawings, which are now briefly described.

FIG. 10 is a diagram illustrating an example parallelization of a program code loop.

FIG. 11A is a diagram illustrating a sequence of variable states during scalar execution of the loop shown in Example 1.

FIG. 11B is a diagram illustrating a progression of execution for Macroscalar vectorized program code of the loop of Example 1.

FIG. 12A and FIG. 12B are diagrams illustrating one embodiment of the vectorization of program source code.

FIG. 13A is a diagram illustrating one embodiment of non-speculative vectorized program code.

FIG. 13B is a diagram illustrating another embodiment of speculative vectorized program code.

FIG. 14 is a diagram illustrating one embodiment of vectorized program code.

FIG. 15 is a diagram illustrating another embodiment of vectorized program code.

Figure 1:
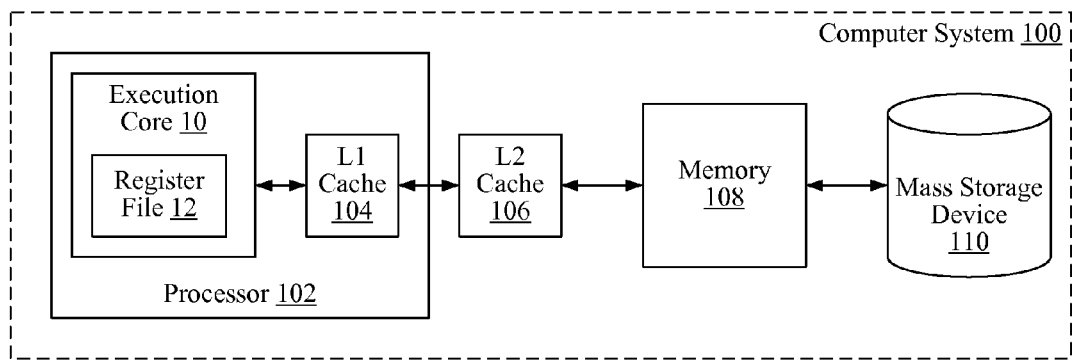
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104 and an execution core 10 coupled to the L1 cache 104. The execution core 10 includes a register file 12 as shown. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Multiple processors similar to the processor 102 may be included. Additionally, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, the processor 102 may be representative of a general-purpose processor that performs computational operations. For example, the processor 102 may be a central processing unit (CPU) such as a microprocessor, a microcontroller, an application-specific integrated circuit (ASIC), or a field-programmable gate array (FPGA). The processor 102 may include one or more mechanisms for vector processing (e.g., vector execution units). The processor 102 may be a standalone component, or may be integrated onto an integrated circuit with other components (e.g. other processors, or other components in a system on a chip (SOC)). The processor 102 may be a component in a multichip module (MCM) with other components.

More particularly, as illustrated in FIG. 1, the processor 102 may include the execution core 10. The execution core 10 may be configured to execute instructions defined in an instruction set architecture implemented by the processor 102. The execution core 10 may have any microarchitectural features and implementation features, as desired. For example, the execution core 10 may include superscalar or scalar implementations. The execution core 10 may include in-order or out-of-order implementations, and speculative or non-speculative implementations. The execution core 10 may include any combination of the above features. The implementations may include microcode, in some embodiments. The execution core 10 may include a variety of execution units, each execution unit configured to execute operations of various types (e.g. integer, floating point, vector, load/store, etc.). The execution core 10 may include different numbers pipeline stages and various other performance-enhancing features such as branch prediction. The execution core 10 may include one or more of instruction decode units, schedulers or reservations stations, reorder buffers, memory management units, I/O interfaces, etc.

The register file 12 may include a set of registers that may be used to store operands for various instructions. The register file 12 may include registers of various types, based on the type of operand the execution core 10 is configured to store in the registers (e.g. integer, floating point, vector, etc.). The register file 12 may include architected registers (i.e. those registers that are specified in the instruction set architecture implemented by the processor 102). Alternatively or in addition, the register file 12 may include physical registers (e.g. if register renaming is implemented in the execution core 10).

The L1 cache 104 may be illustrative of any caching structure. For example, the L1 cache 104 may be implemented as a Harvard architecture (separate instruction cache for instruction fetching by the fetch unit 201 and data cache for data read/write by execution units for memory-referencing ops), as a shared instruction and data cache, etc. In some embodiments, load/store execution units may be provided to execute the memory-referencing ops.

An instruction may be an executable entity defined in an instruction set architecture implemented by the processor 102. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 102. Some instructions may be microcoded, in some embodiments. Accordingly, the term "instruction operation" may be used herein to refer to an operation that an execution unit in the processor 102/execution core 10 is configured to execute as a single entity. Instructions may have a one to one correspondence with instruction operations, and in some cases an instruction operation may be an instruction (possibly modified in form internal to the processor 102/execution core 10). Instructions may also have a one to more than one (one to many)

correspondence with instruction operations. An instruction operation may be more briefly referred to herein as an "op."

The mass-storage device 110, memory 108, L2 cache 10, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 10, and L1 cache 104 are all examples of non-transitory computer readable storage devices.

As mentioned above, the execution core 10 may be configured to execute vector instructions. The vector instructions may be defined as single instruction-multiple-data (SIMD) instructions in the classical sense, in that they may define the same operation to be performed on multiple data elements in parallel. The data elements operated upon by an instance of an instruction may be referred to as a vector. However, it is noted that in some embodiments, the vector instructions described herein may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.).

In one embodiment, the register file 12 may include vector registers that can hold operand vectors and result vectors. In some embodiments, there may be 32 vector registers in the vector register file, and each vector register may include 128 bits. However, in alternative embodiments, there may be different numbers of vector registers and/or different numbers of bits per register. The vector registers may further include predicate vector registers that may store predicates for the vector instructions, and may also store one or more vector attributes as described in further detail below. Furthermore, embodiments which implement register renaming may include any number of physical registers that may be allocated to architected vector registers and architected predicate vector registers. Architected registers may be registers that are specifiable as operands in vector instructions.

In one embodiment, the processor 102 may support vectors that hold N data elements (e.g., bytes, words, doublewords, etc.), where N may be any positive whole number. In these embodiments, the processor 102 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of the processor 102.

In some embodiments, as described in greater detail below, based on the values contained in a vector of predicates or one or more scalar predicates, the processor 102 applies vector operations to selected vector data elements only. In some embodiments, the remaining data elements in a result vector remain unaffected (which may also be referred to as "masking" or "masking predication") or are forced to zero (which may also be referred to as "zeroing" or "zeroing predication"). In some embodiments, the clocks for the data element processing subsystems ("lanes") that are unused due to masking or zeroing in the processor 102 can be power and/or clock-gated, thereby reducing dynamic power consumption in the processor 102. Generally a predicate may refer to a value that indicates whether or not an operation is to be applied to a corresponding operand value to produce a result. A predicate may, e.g., be a bit indicating that the operation is to be applied in one state and not applied in the other state. For example, the set state may indicate that the operation is to be applied and the clear state may indicate that the operation is not to be applied (or vice versa). A vector element to which the operation is to be applied as indicated in the predicate is referred to as an active vector element. A vector element to which the operation is not to be applied as indicated in the predicate is referred to as an inactive vector element.

In various embodiments, the architecture may be vector-length agnostic to allow it to adapt to parallelism at runtime. More particularly, when instructions or ops are vector-length agnostic, the operation may be executed using vectors of any length. A given implementation of the supporting hardware may define the maximum length for that implementation. For example, in embodiments in which the vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware. In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

Processor

Figure 2:
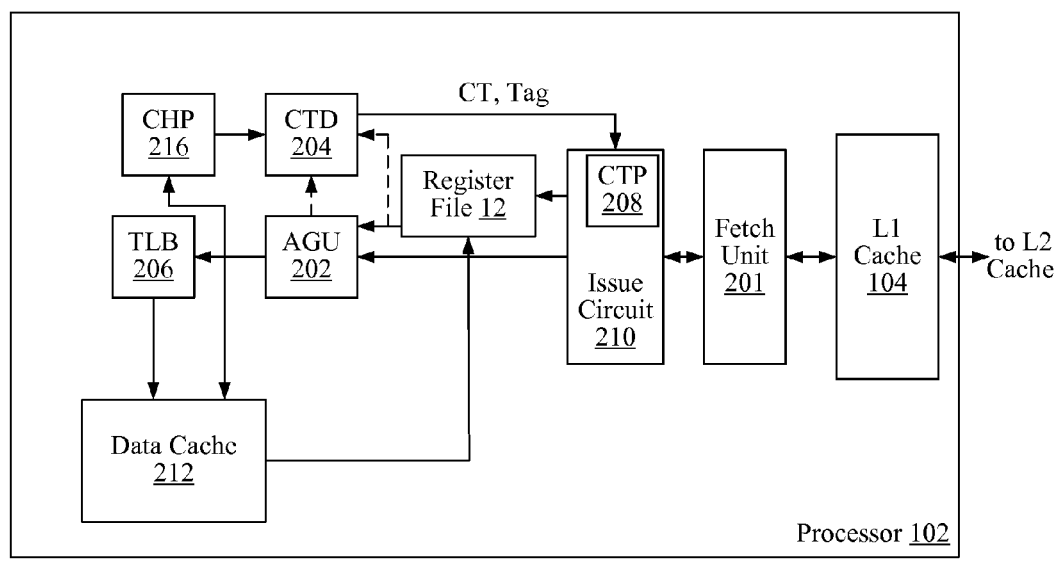
FIG. 2 is a block diagram of one embodiment of a processor shown in FIG. 1.

Referring to FIG. 2, a block diagram illustrating additional details of an embodiment of a portion of the processor 102 of FIG. 1 is shown. In the embodiment shown in FIG. 2, the processor 102 may include a number of pipeline stages, although for brevity not all are shown in FIG. 2. In the illustrated embodiment, the processor 102 includes the L1 cache 104, an instruction fetch unit 201, an issue circuit 210 (which may include a completion time prediction (CTP) circuit 208 in some embodiments), the register file 12, an address generation unit 202, a completion time determination (CTD) circuit 204, a translation lookaside buffer (TLB) 206, a cache hit prediction (CHP) circuit 216, and a data cache 212 (which may also be an L1 cache). Not shown in FIG. 2 are various other execution units (e.g. one or more integer execution units, one or more floating point execution units, one or more vector execution units, etc.). It is noted that the integer execution units, floating-point execution units, and vector execution units as a group may be interchangeably referred to as "the execution units." As illustrated in FIG. 2, the L1 cache 104 may be coupled to the fetch unit 201, which may be coupled to the issue circuit 210. The issue circuit may be coupled to the register file 12, the AGU 202, and the CTD circuit 204. The register file 12 may be further coupled to the AGU 202, the data cache 212, and the CTD circuit 204 The AGU 202 may be coupled to the CTD circuit 204 and the TLB 206. The TLB 206 may be coupled to the data cache 212. The CHP circuit 216 may be coupled to the data cache 212 and the CTD 204. The issue circuit and the register file 12 may be coupled to the other execution units (not shown).

The fetch unit 201 may be configured to fetch instructions from the L1 Cache 104. The fetch unit 201 may include various branch prediction mechanisms, next fetch predictors, and/or other speculative instruction stream mechanisms that permit fetching down a speculative instruction path to provide instructions for execution. The fetch unit 201 may include decode circuitry as well to decode the instructions, in some embodiments. An instruction stream may generally be a set of instructions arranged for execution to accomplish an overall task. The stream may be executed out-of-order if the processor 102 implements out of order processing. The stream may not necessarily be stored at consecutive addresses in memory, as branches and the like may cause fetching to continue at different addresses than the next sequential address. The fetch unit 201 may further include decode circuitry and/or microcoding to decode the fetched instructions into ops, as mentioned above.

The issue circuit 210 may be coupled to receive ops from the fetch unit 201 and may be configured to schedule ops for execution by the execution units. Generally, the issue circuit 210 may be configured to monitor the ops held by the issue circuit 210, identifying ops for which the input operands are "ready" and scheduling the oldest ops that are ready and for which execution resources (e.g. execution units) are available to execute the ops. Particularly, based on the execution latency of a given op, the issue circuit 210 may determine when the ops that depend on the output register of the given op are ready (at least with respect to the dependency on the given op). The dependent ops may be scheduled, at the earliest, such that they arrive at the execution stage or other data-forwarding stage at a time when the input operands may be forwarded. There may be one or more pipeline stages between issue and execution/forwarding (e.g. a register file read stage) and the ops may be scheduled based on the pipeline delays as well as the execution latency of the ops providing the operands. For load memory operations, including vector load memory operations, data may be forwarded from a cache access stage at which data is read from the data cache 212. For store memory operations, including vector store memory operations, data may be forwarded at a stage in which data is written to a store queue (not shown) and thus is available for dependent load memory operations.

In various embodiments, the execution units may perform computational operations such as logical operations, mathematical operations, or bitwise operations, for example, for an associated type of operand. More specifically, the integer execution unit(s) may perform computational operations that involve integer operands, the floating-point execution unit(s) may perform computational operations that involve floating-point operands, and the vector execution unit(s) may perform computational operations that involve vector operands. Any suitable configurations maybe employed for the execution units, depending on the particular configuration of architectural and performance parameters governing a particular processor design.

Generally, the execution units may operate on operands from registers in the register file 12 (although the data may be forwarded as generated for storage in the register file 12) and may generate results to be written to the register file 12. Memory-referencing ops may be used to move data between the register file 12 and data cache 212/memory. The AGU 202, the TLB 206, and the data cache 212 may all be involved in the execution of the memory-referencing ops (or, more briefly, memory ops).

More particularly, the issue circuit 210 may be configured to issue memory ops to the AGU 202. The issue circuit 210 may also be configured to issue register reads to the register file 12 for the address operands of the memory op. The register file 12 may be configured to provide the address operands to the AGU 202, which may be configured to generate the addresses for the memory ops. The addresses generated by the AGU 202 may be effective (or virtual) addresses, which may be translated to physical addresses to access memory according to an address translation mechanism implemented by the processor 102. The TLB 206 may cache translation information and may translate the addresses. The physical addresses may be used to access the data cache 212. Alternatively the access to the data cache 212 may begin using the virtual address, and the physical address may be used to detect or verify cache hit/miss. For loads, the data may be forwarded to the register file 12 for storage in the destination registers of the loads. For stores, the data may be written to the data cache 212.

For scalar memory operations (e.g. memory operations that read/write integers or floating-point numbers), the latency to complete the memory operation may be fixed (assuming a cache hit in the data cache 212). However, even in the case of cache hits for the vector memory operations, the latency to complete the operation may be variable. The number of cache accesses and/or page accesses may vary based on the address operands of the vector memory operations. Each unique page access may result in a TLB access to the TLB 206, and each unique cache access (e.g. each cache block or cache line access) may result in a data cache 212 access. In some embodiments, even vector elements stored in the same cache block/line may result in separate cache accesses. In other embodiments, vector elements stored within the same cache block may be accessed concurrently. Generally, a page may be the granularity at which address translations are made. That is, any addresses in the page may use the same translation. Page sizes of 4 kilobytes, 8 kilobytes, 16 kilobytes, 1 Megabyte, 2 Megabytes, etc. are often used. Any page size may be used in various embodiments. The cache block may be the granularity at which data is cached in the data cache 212. Cache block sizes of 32 bytes, 64 bytes, 128 bytes, etc. are often used. Any cache block sized may be used in various embodiments.

To provide for more efficient scheduling of ops that depend on vector memory ops, various embodiments of the processor 102 implement the CTP circuit 208, the CTD circuit 204, or both. The CTD circuit 204, in the illustrated embodiment, may be coupled to receive the address operands provided by the register file 12 to the AGU 202. Alternatively or in addition, the CTD circuit 204 may be coupled to receive the addresses generated by the AGU 202. The CTD circuit 204 may be configured to determine the completion time of the vector memory op, and may transmit the completion time (CT) and the tag of the vector memory operation (Tag) to the issue circuit 210. The completion time may be determined based on the number of TLB accesses, the number of cache accesses, etc. The tag may be the tag used by the issue circuit 210 to track the memory operation, and the tag may be transmitted by the issue circuit 210 with the memory operation. The issue circuit 210 may be configured to use the completion time to schedule ops that depend on the vector memory operation (the "dependent ops"), similar to the way in which fixed execution latencies may be used to schedule dependent ops of other ops.

As mentioned above, the CTD circuit 204 may generate the completion time assuming hits in the data cache 212 for the accesses. In another embodiment, the CHP circuit 216 may be implemented. The CHP circuit 216 may monitor accesses to the data cache 212 in order to predict cache hit/miss for the cache accesses performed for a vector memory operation. The CTD circuit 204 may take the predictions into account when determining a completion time. That is, predicted cache misses may result in a larger completion time determination. In some embodiments, prediction of a cache miss may result in an undetermined completion time, and the issue circuit 210 may wait for an indication that the vector memory operation has actually completed (e.g. the tag may be provided once the vector memory operation has been completed) and the dependent ops may be scheduled at that point. The CHP circuit 216 may implement any type of cache hit prediction, in various embodiments.

In other embodiments, the processor 102 may implement the CTP circuit 208 to predict the completion time of a vector memory operation that is being issued by the issue circuit 210. The CTP circuit 208 may be configured to generate the predicted completion time based on the execution of previous instances of the vector memory operation, which the CTP circuit 208 may be configured to track. In some embodiments, the CTP circuit 208 may be configured to track the previous completion times. In other embodiments, the CTP circuit 208 may be configured to track one or more aspects of the previous executions that affect the completion time (e.g. number of TLB access, number of memory accesses, etc.). The CTP circuit 208 may be configured to generate the completion time prediction responsive to the tracked aspects.

In an embodiment, if the completion time prediction is incorrect, the processor 102 may be configured to reissue the vector memory operation (sometimes referred to as replaying the vector memory operation). Reissue of the vector memory operation may subsequently cause reissue of the dependent ops, permitting correct execution of the ops. When the vector memory operation is reissued, the actual completion time may be known and may be used to schedule dependent ops. Additionally, the CTP circuit 208 may update the tracked data for the vector memory operation in response to the incorrect prediction.

In some embodiments, both the CTP circuit 208 and the CTD circuit 204 may be employed. The CTP circuit 208 may be used to generate the completion time prediction, and the CTD circuit 204 may be used to verify the prediction. Additionally, in embodiments in which the CTP circuit 208 tracks aspects of the vector memory operation executions, the CTD circuit 204 may provide the aspects for a current execution of the vector memory operation to the CTP circuit 208.

The completion time may be measured in any desired fashion. In an embodiment, the completion time may be measured in clock cycles of the clock supplied to the processor 102 (and which clocks the pipeline of the processor 102). Particularly, the completion time may be relative to the clock cycle at which the vector memory operation is issued. Alternatively, the completion time may be relative to the clock cycle at which the completion time is determined (e.g. at or near the execution of the first TLB access, the first cache access, or other initial execution of the vector memory operation).

While the instruction set architecture may specify that vector instructions are vector length agnostic, vector attributes may be useful to the vector hardware. In an embodiment, the predicate vector registers may store both the predicates and one or more vector attributes for the corresponding vector operation. The vector attribute may generally specify any architected and/or implementation-specific size information. For example, in an embodiment, vector attributes may specify at least one of a vector element size (specifying one of a set of supported vector element sizes for a particular operation), vector size (e.g. size of the vector registers, e.g. in bits or bytes), number of vector elements per vector, number of elements per partition, number of partitions per vector, or partition size. A partition may be a subset of a vector on which certain operations are defined to operation. For example, a vector operation that reverses the order of the vector elements may operate on partitions within the vector register, reversing the order within each partition.

Figure 3:
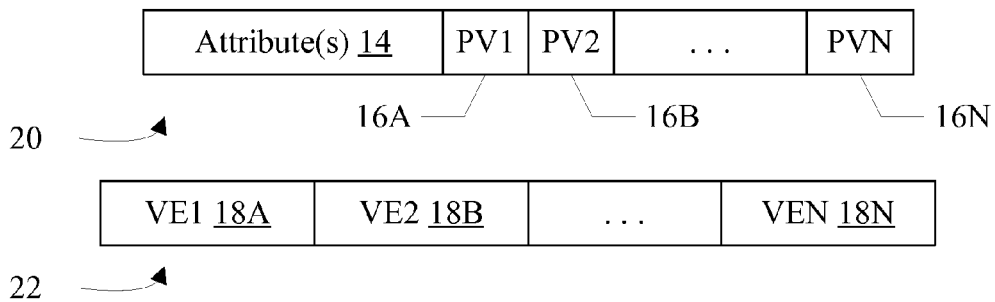
FIG. 3 is a block diagram of one embodiment of a predicate vector register and a vector register.

In an embodiment, the predicate vector registers may be architected to store one or more vector attributes, and the vector registers may store vector elements (N elements, where N is implementation-specific). FIG. 3 is a block diagram illustrating an exemplary predicate vector register 20 and an exemplary vector register 22 as architected according to one embodiment of the instruction set architecture implemented by the processor 102. As illustrated in FIG. 3, the predicate vector register 20 includes an attributes field 14 and N predicate fields 16A-16N. The N predicate fields correspond to the N vector element fields 18A-18N of the vector register 22.

More particularly, some vector instructions may explicitly define vector attributes. That is, the encoding of the instruction itself (e.g. the opcode, one or more other fields of the instruction such as an immediate field, etc.) may specify the vector attribute. For example, an embodiment includes predicate vector initialization instructions, which are defined to initialize predicate vector registers with true predicates (predicates which cause the corresponding vector elements to be operated upon, e.g. the set state) or false predicates (predicates which cause the corresponding vector elements to not be operated upon, e.g. the clear state). The predicate vector initialization instructions may also explicitly specify the vector attributes. In an embodiment, memory-referencing instructions may explicitly specify vector attributes. Memory-referencing instructions may include vector load memory operations, or more briefly vector loads or simply loads. Vector load memory operations may read data from memory into registers, although the read may be accomplished in cache. Memory-referencing instructions may include vector store memory operations, or more briefly vector stores or simply stores. Vector store memory operations may write data from registers to memory, although the write may be accomplished in cache. Since the vector attributes may affect the amount of memory that is read/written (e.g. the number of consecutive bytes at each vector location), the memory-referencing instructions may explicitly identify the vector attributes.

Generally, an issue circuit may be any circuitry configured to receive ops and schedule the ops for execution. An issue circuit may be centralized (e.g. a centralized scheduler or centralized reservation station) that schedules ops for execution in all execution units. An issue circuit may also be decentralized (e.g. reservation stations) that receive and schedule ops of a particular type and/or ops for a particular execution unit. Any issue circuitry may be implemented in various embodiments.

The L1 cache 104 and the data cache 212 may be illustrative of any caching structure. For example, the L1 cache 104 may be implemented as a Harvard architecture (separate instruction cache for instruction fetching by the fetch unit 201 and data cache 212 for data read/write for memory-referencing ops). In other embodiments, the L1 cache 104 and the data cache 212 may be merged as a shared instruction and data cache.

Figure 4:
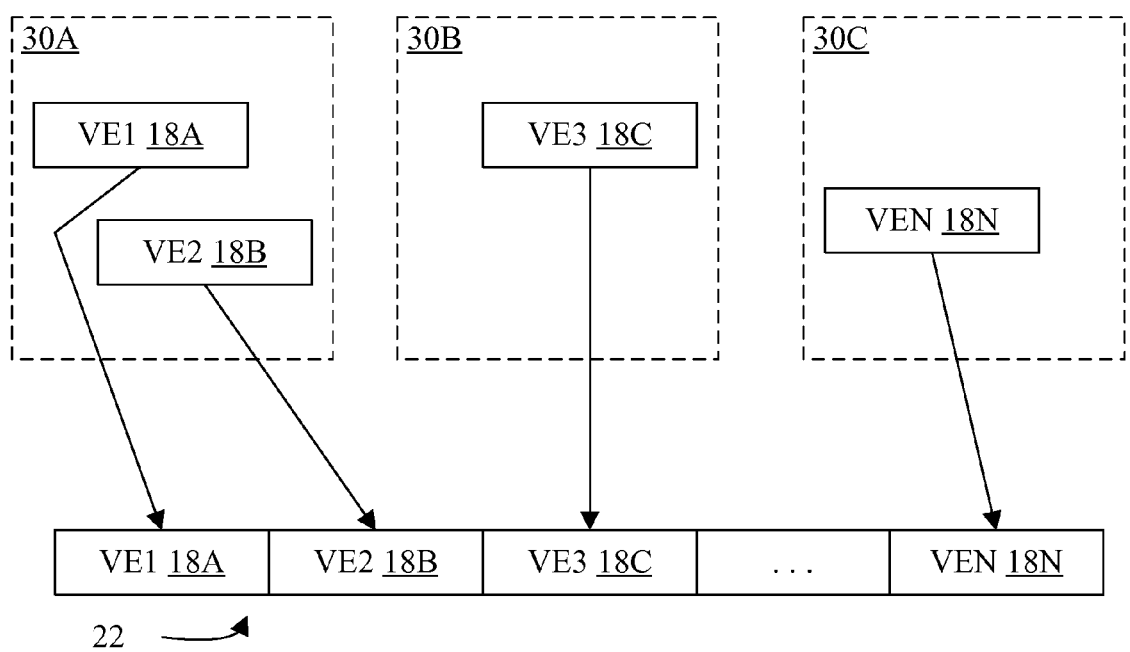
FIG. 4 illustrates an embodiment of a vector load operation and gathering vector elements.

FIG. 4 is a block diagram illustrating one embodiment of a vector load memory operation and corresponding vector elements in memory. A vector store memory operation may be similar to the illustrated vector load memory operation, but may also include a source vector register from which the data to be written to memory is read. As illustrated in FIG. 4, the vector load memory operation (Vload) includes a destination vector register (Dest) to which the vector is written. One or more source address operands (vaddrops) may be provided to specify the memory locations of the vector elements to be read into the destination vector register. The vector load memory operation may further include a predicate vector (p) that specifies which vector elements are active, in some embodiments.

The source address operands may include any combination of vector and/or scalar values that specify the addresses of the vector elements to be read (or to which the vector elements are to be written, in the case of a vector store memory operation). The source address operands may include one or more vector registers storing vectors of addresses or displacements, one or more integer registers storing scalar addresses (e.g. base addresses to which vectors of displacements are to be added), and/or a displacement or immediate field of the vector memory operation. Specifically, in an embodiment, a vector of addresses may be specified by a base address and a vector of displacements (or offsets) from the base address.

As illustrated in FIG. 4, the vector load memory operation may gather vector elements for various memory locations (reference numerals 18A-18N) into the vector register 22. The memory locations need not be consecutive. In the illustrated embodiment, the vector elements may be located in various regions 30A-30C of the memory. The regions 30A-30C may delimit memory locations that share a particular property. For example, the regions 30A-30C may be pages, where each address within a given page is translated using the same translation, which may be cached in the TLB 206. The regions 30A-30C may be cache blocks, where a given cache block is stored in one cache line in the data cache 212. The number of regions 30A-30C from which the memory elements are gathered may affect the completion time of the vector load memory operation. Thus, the number of regions 30A-30C may be an attribute or an aspect of the vector load memory operation which may be determined by the CTD circuit 204 and/or predicted by the CTP circuit 208, in various embodiments, in order to determine/predict the completion time of the vector load memory operation.

Figure 5:
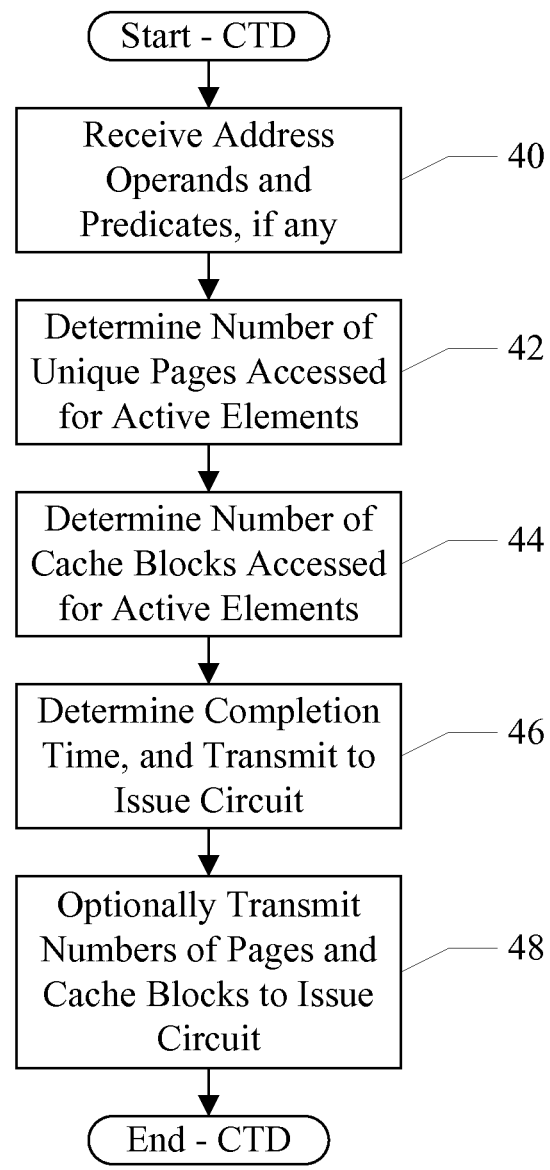
FIG. 5 is a flowchart illustrating operation of one embodiment of a completion time determination circuit shown in FIG. 2.

Turning now to FIG. 5, a flowchart is shown illustrating operation of one embodiment of the CTD circuit 204. While the blocks are shown in a particular order for ease of understanding, other orders may be used. Blocks may be performed in parallel in combinatorial logic circuitry in the CTD circuit 204. Blocks, combinations of blocks, and/or the flowchart as a whole may be pipelined over multiple clock cycles. The CTD circuit 204 may be configured to perform the operation illustrated in FIG. 5.

The CTD circuit 204 may receive the address operands and predicate vector for the vector memory operation (block 40). The address operands may be received from the register file 12 and/or from the memory operation itself (e.g. a displacement or immediate field of the memory operation). Alternatively, the CTD circuit 204 may receive the vector of addresses from the AGU 202. The CTD circuit 204 may be configured to determine the number of unique pages accessed to execute the vector memory operation (block 42). Each unique page may result in a TLB access, which may affect the completion time. The number of unique pages may be affected by the predicate, if any, since only active elements may be considered if a predicate is included. Similarly, the CTD circuit 204 may be configured to determine the number of cache blocks accessed for the active elements of the vector memory operation (block 44). Each unique cache block access may result in a cache access, and thus may affect the completion time. In an embodiment, multiple vector elements may be accessed from a given cache block in parallel, and thus only one access to the cache block may be required. In another embodiment, vector elements that are consecutive in the result vector or in consecutive memory locations of the cache block may be accessed in parallel, and thus the number of cache blocks accessed may be affected by the locations of the vector elements. In an embodiment, each active element may be considered to be a cache access and thus the number of cache blocks may be the number of active elements.

Responsive to the number of pages, the number of cache blocks, and/or the number/identification of active elements, the CDT circuit 204 may be configured to determine the completion time of the vector memory operation (block 46). Each TLB access and cache access may imply a certain amount of latency in completing the operation, and thus the latencies may be computed and added (accounting for pipeline overlap as appropriate) to determine the completion time. The completion time may assume that each translation hits in the TLB 206 and the each cache block hits in the data cache 212. Alternatively, cache hit/miss may be predicted by the CHP circuit 216. The predicted hits and misses may be used in the determination of the completion time. The CDT circuit 204 may further determine the completion time responsive to any other attributes/aspects of the memory operation that may be considered, in other embodiments. The CDT circuit 204 may be configured to transmit an indication of the completion time and an identifier of the vector memory operation (e.g. a tag used by the issue circuit 210 to track the vector memory operation) to the issue circuit 210. In some embodiments (e.g. some embodiments employing the CTP circuit 208), the CTD circuit 204 may be configured to transmit numbers of pages and cache blocks accessed by the vector memory operation to issue circuit 210 as well (block 48).

Figure 6:
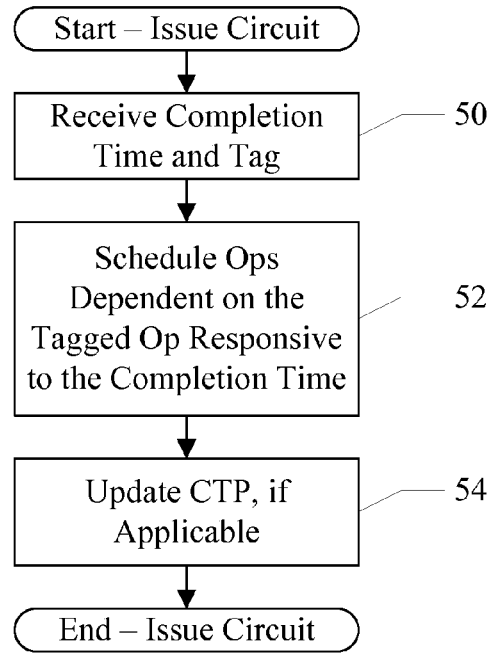
FIG. 6 is a flowchart illustrating operation of one embodiment of an issue circuit.

FIG. 6 is a flowchart illustrating operation of one embodiment of the issue circuit 210 responsive to a communication from the CTD circuit 204. While the blocks are shown in a particular order for ease of understanding, other orders may be used. Blocks may be performed in parallel in combinatorial logic circuitry in the issue circuit 210. Blocks, combinations of blocks, and/or the flowchart as a whole may be pipelined over multiple clock cycles. The issue circuit 210 may be configured to perform the operation illustrated in FIG. 6.

The issue circuit 210 may receive the completion time and the tag from the CTD circuit 204 (block 50). Based on the completion time, the issue circuit 210 may be configured to schedule ops dependent on the vector memory operation (the "tagged op") (block 52). For example, the issue circuit 210 may be configured to schedule the dependent ops for a clock cycle in which, if issued on that clock cycle, will result in the dependent op arriving at a forwarding stage in the pipeline of the processor 102 at a same time as the data from the vector memory operation is forwarded. The dependent ops may be scheduled in the dependency on the tagged op is the last dependency of the op to resolve. In embodiments that implement the CTP circuit 208 and transmit the various aspects of the vector memory operation determined by the CTD circuit 204, the issue circuit 210 may be configured to update the CTP circuit 208 if applicable (block 54).

Figure 7:
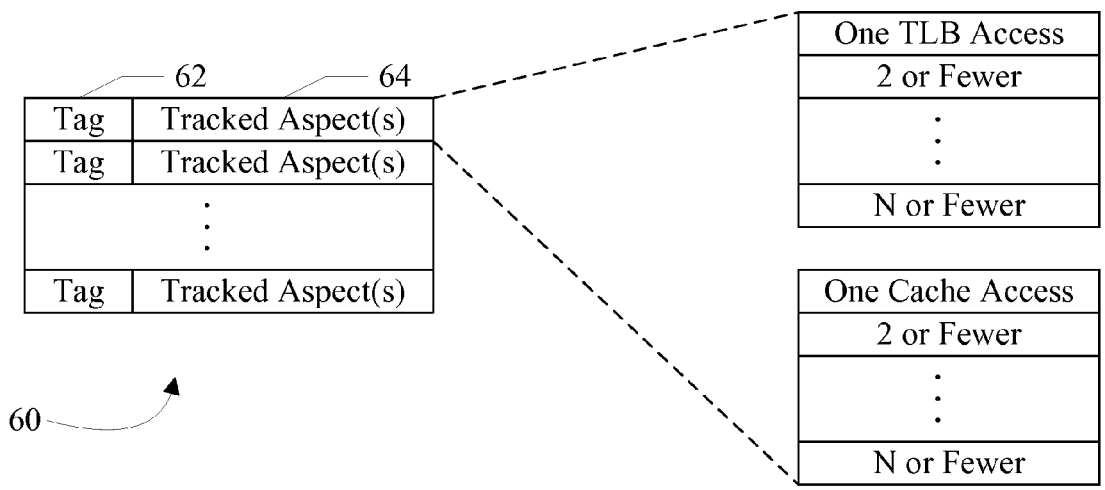
FIG. 7 is a block diagram of one embodiment of trackers in one embodiment of a completion time prediction circuit shown in FIG. 2.

FIG. 7 is a block diagram of one embodiment of a table 60 that may be implemented in one embodiment of the CTP circuit 208 to track aspects of vector memory operations in order to predict completion times. Each entry in the table 60 may include a tag field 62 and a tracked aspects field 64. The tag field 62 may store data that identifies, with at least a reasonable degree of accuracy, a corresponding vector memory operation being tracked by the CTP circuit 208. The tag field 62 may include a portion or all of the program counter (PC) address of the instruction from which the vector memory operation derives, other data such as a portion of the instruction or op encoding (e.g. source operand specifier), logical combinations of the above, etc.

The tracked aspects field 64 may store any data used to track aspects of the vector memory operation to predict the completion time of the vector memory operation. For example, the tracked aspects field 64 for an entry is shown in exploded view. The illustrated embodiment may include a set of N trackers for the TLB accesses and a set of N trackers for the cache accesses. Each TLB tracker may track whether the number of TLB access is less than or equal to a corresponding number of accesses, from 1 to N. Thus, for example, a first TLB tracker may track the number of times that there is one TLB access, a second TLB tracker may track the number of times that there is two or fewer TLB access, etc. up to an Nth TLB tracker that may track the number of times that there is N or fewer accesses. Similarly, each cache tracker may track whether the number of cache accesses is less than or equal to the corresponding number of accesses, from 1 to N. N may be an integer. For example, N may be the number of vector elements in a vector in a given implementation, or a maximum number of vector elements in the vector, if the number of elements varies. Alternatively, N may be the maximum number of pages accessible in response to a vector memory operation and a maximum number of cache lines accessible in response to the vector memory operation, respectively. The maximum numbers may depend on how the address operands are specified, for example.

Thus, each time the number of TLB accesses and cache accesses is determined during execution of the corresponding vector memory operation, the tracked aspects field may be updated to increment the trackers that correspond to that number of accesses and each tracker corresponding to a higher number of accesses. The increments may saturate at a maximum count that is dependent on the size of the tracker.

In some embodiments, the number of executions of the corresponding vector memory operation may also be tracked in the entry. In some embodiments, other aspects may be tracked as well. For example, the number of active elements may be a tracked aspect in some embodiments, and may be tracked with a set of N trackers similar to the above discussion. Any desired set of aspects/attributes of the vector memory operations may be tracked.

Figure 8:
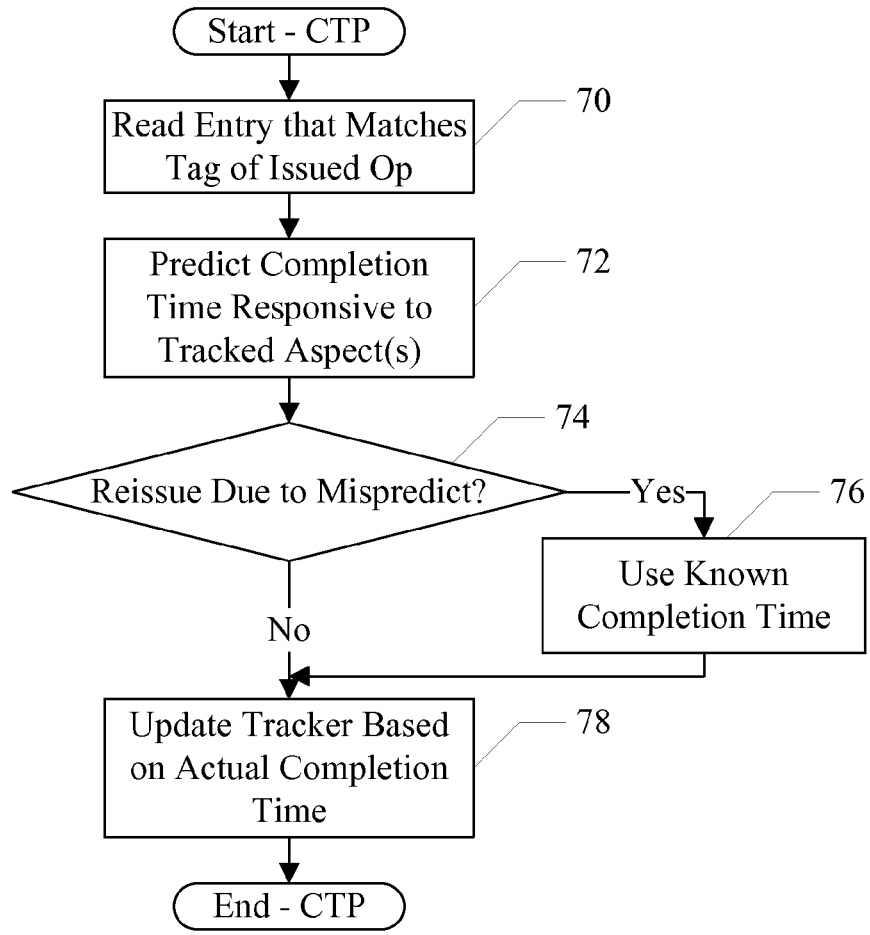
FIG. 8 is a flowchart illustrating operation of one embodiment of a completion time prediction circuit shown in FIG. 2.
Figure 9:
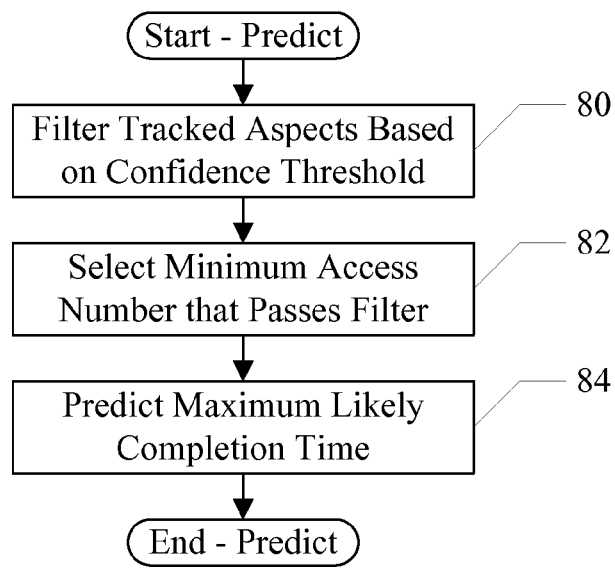
FIG. 9 is a flowchart illustrating operation of one embodiment of prediction block shown in FIG. 8.

FIGS. 8 and 9 are flowcharts illustrating operation of one embodiment of the CTP circuit 208 to predict a completion time of a vector memory operation. While the blocks are shown in a particular order for ease of understanding, other orders may be used. Blocks may be performed in parallel in combinatorial logic circuitry in the CTP circuit 208. Blocks, combinations of blocks, and/or the flowchart as a whole may be pipelined over multiple clock cycles. The CTP circuit 208 may be configured to perform the operation illustrated in FIGS. 8 and 9.

The CTP circuit 208 may be configured to read the entry of the table 60 that matches the tag of the issued vector memory op (block 70). If there is no matching entry, the CTP circuit 208 may be configured to allocate an entry based on any desired replacement scheme (e.g. least recently used, least recently replaced, most recently used, pseudo versions of any of the above, combinations of any of the above, and/or random replacement). The CTP circuit 208 may be configured to write the tag of the op to the allocated entry, and may initialize the tracked aspects to zero.

The CTP circuit 208 may be configured to predict the completion time of the issued vector memory op responsive to the tracked aspects read from the entry (block 72). The mechanism for predicting the completion time may vary dependent on the form of the tracked aspects. For example, FIG. 9 is a detailed view of the predict block 72 for an embodiment of the CTP circuit 208 that implements the trackers shown in FIG. 7. In this embodiment, the CTP circuit 208 may filter the trackers based on a confidence threshold (block 80). The confidence threshold may be set based on the counts that are expected to result in reasonably accurate predictions. The confidence threshold may be fixed, or may be programmable in a register within the CTP circuit 208. In embodiments that count the number of executions of the vector memory operations (e.g. the number of previous instances of the vector memory operation that are tracked in the trackers), the confidence threshold may be the number of executions, or may be a fraction of the number of executions or otherwise derived from the number of executions.

Responsive to the filtered trackers, the CTP circuit 208 may be configured to select the minimum access number that passes the filter (block 82). The maximum likely completion time may be determined by the minimum access numbers and the implied latencies (accounting for pipeline overlap) (block 84).

If the vector memory op is subsequently reissued (or replayed during execution) due to a misprediction of the completion time (decision block 74, "yes" leg), the correct completion time may be known. Thus, the known completion time may be used as the "prediction" of the completion time during the reissue (block 76). The replay/reissue of the vector memory op may also cause dependent ops to be reissued (and in some embodiments may cause the reissue of each op subsequent to the reissued op in program order), thus resulting in correct execution and forwarding after the reissue.

In either case, the CTP circuit 208 may be configured to update the trackers based on the actual completion time of the vector memory op (block 78).

Macroscalar Architecture Overview

Various embodiments of an instruction set architecture (referred to as the Macroscalar Architecture) and supporting hardware may allow compilers to generate program code for loops without having to completely determine parallelism at compile-time, and without discarding useful static analysis information, will now be described. The embodiments may include the hazard check instruction described above. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 10.

Referring to the left side of FIG. 10, an execution pattern is shown with four iterations (e.g., iterations 1-4) of a loop that have not been parallelized, where each loop includes instructions A-G. Serial operations are shown with instructions vertically stacked. On the right side of FIG. 10 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 10, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 10 and described above in the parallelized loop example. For ease of understanding, these examples are presented using pseudocode in the C++ format.

It is noted that the following example embodiments are for discussion purposes. The instructions and operations shown and described below are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b. Note that vector p5 may be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

~p5; a=b+c;

Only elements in vector 'a' designated by active (i.e., non-zero) elements in the predicate vector p5 receive the result of b+c. The remaining elements of a are unchanged. This operation is called "predication," and is denoted using the tilde ("~") sign before the predicate vector.

!p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

```
if (FIRST( )) goto ..; // Also LAST( ), ANY( ), ALL( ), CARRY( ),
ABOVE(
), or NONE( ), (where ANY( ) == !NONE( ))
```

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A [x]<FACTOR) is known to be always true or always false. These assumptions change when the condition is allowed to vary during execution (the common case). For simplicity in this example, we presume that no aliasing exists between A[ ] and B[ ].

Example 1

Program Code Loop

```
r = 0;
s = 0;
for (x=0; x<KSIZE; ++x)
{
    if (A[x] < FACTOR)
    { r = A[x+s];
    }
    else
    {
    s = A[x+r];
    }
    B[x] = r + s;
}
```

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=VectorIndex(Start, Increment)

VectorIndex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

x=VectorIndex(0,1); //x={0 1 2 3 4 5 6 7} dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

```
Entry:   dest = {8 9 A B C D E F}
         src = {1 2 3 4 5 6 7 8}
         pred = {0 0 1 1 0 0 1 0}
Exit:    dest = {8 9 A B 4 4 E 7}
``` dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

```
Entry:   src = {1 2 3 4 5 6 7 8}
         pred = {1 0 1 1 0 0 1 0}
Exit:    dest = {8 2 2 2 5 6 6 8}
         dest=ConditionalStop(pred, deps)
```

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

```
p1 = (t < FACTOR);          // p1 = {00001100}
p2 = ConditionalStop(p1, kTF|kFT); // p2 = {00004060}
```

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of Pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

```
Entry Conditions:       // i2 = {0 0 0 0 4 0 6 0}
p2 = 0;                 // p2 = {0 0 0 0 0 0 0 0}
Loop2:
p2 = GeneratePredicates(p2,i2); // p2' = {1 1 1 1 0 0 0 0}
CF = 0, ZF = 0
if(!PLAST( )) goto Loop2   // p2" = {0 0 0 1 1 0 0}
CF = 0, ZF = 0             // p2'" = {0 0 0 0 0 0 1 1}
CF = 1, ZF = 0
```

From an initialized predicate p2 of all zeros, GeneratePredicates generates new instances of p2 that partition subsequent vector calculations into three sub-vectors (i.e., p', p", and p"). This enables the hardware to process the vector in groups that avoid violating the data dependencies of the loop.

In FIG. 11A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 11B a diagram illustrating a progression of execution for Macroscalar vectorized program code of the loop of Example 1 is shown. In FIG. 11A and FIG. 11B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 11B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 12A and FIG. 12B, diagrams illustrating one embodiment of the vectorization of program code are shown. FIG. 12A depicts the original source code, while FIG. 12B illustrates the vectorized code representing the operations that may be performed using the Macroscalar architecture. In the vectorized code of FIG. 12B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

Example 2A

Program Code Loop 1

```
j = 0;
for (x=0; x<KSIZE; ++x)
```

-continued

```
{
if (A[x] < FACTOR)
{
j = A[x+j];
}
B[x] = j;
}
```

Example 2B

Program Code Loop 2

```
j = 0;
for (x=0; x<KSIZE; ++x)
{
if (A[x+j] < FACTOR)
{
j = A[x];
}
B[x] = j;
}
```

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mis-predicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

```
Entry: pred = {0 0 1 0 1 0 0 0}
Exit:  dest = {0 0 0 0 0 1 1 1}
```

FIG. 13A and FIG. 13B are diagrams illustrating embodiments of example vectorized program code. More particularly, the code sample shown in FIG. 13A is a vectorized version of the code in Example 2A (as presented above). The code sample shown in FIG. 13B is a vectorized version of the code in Example 2B. Referring to FIG. 13B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 13A and FIG. 13B, there exists a loop-carried dependency between iterations where the condition is true, and subsequent iterations, regardless of the predicate value for the later iterations. This is reflected in the parameters of the ConditionalStop instruction.

The sample program code in FIG. 13A and FIG. 13B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

In the previous examples, the compiler was able to establish that no address aliasing existed at the time of compilation. However, such determinations are often difficult or impossible to make. The code segment shown in Example 3 below illustrates how loop-carried dependencies occurring through memory (which may include aliasing) are dealt with in various embodiments of the Macroscalar architecture.

Example 3

Program Code Loop 3

```
for (x=0; x<KSIZE; ++x)
{
  r = C[x];
  s = D[x];
  A[x] = A[r] + A[s];
}
```

In the code segment of EXAMPLE 3, the compiler cannot determine whether A[x] aliases with A[r] or A[s]. However, with the Macroscalar architecture, the compiler simply inserts instructions that cause the hardware to check for memory hazards at runtime and partitions the vector accordingly at runtime to ensure correct program behavior. One such instruction that checks for memory hazards is the CheckHazardP instruction which is described below.

dest=CheckHazardP (first, second, pred)

The CheckHazardP instruction examines two vectors of a memory address (or indices) corresponding to two memory operations for potential data dependencies through memory. The vector 'first' holds addresses for the first memory operation, and vector 'second' holds the addresses for the second operation. The predicate 'pred' indicates or controls which elements of 'second' are to be operated upon. As scalar loop iterations proceed forward in time, vector elements representing sequential iterations appear left to right within vectors. The CheckHazardP instruction may evaluate in this context. The instruction may calculate a DIV representing memory hazards between the corresponding pair of first and second memory operations. The instruction may correctly evaluates write-after-read, read-after-write, and write-after-write memory hazards. The CheckHazardP instruction may be an embodiment of the hazard check instruction described previously.

As with the ConditionalStop instruction described above, the element position corresponding to the iteration that generates the data that is depended upon may be stored in the destination vector at the element position corresponding to the iteration that is dependent upon the data. If no data dependency exists, a zero may be stored in the destination vector at the element position corresponding to the iteration that does not have the dependency. For example:

```
Entry: first = {2 3 4 5 6 7 8 9}
       second = {8 7 6 5 4 3 2 1}
       pred   = {1 1 1 1 1 1 1 1}
Exit:  dest   = {0 0 0 0 3 2 1 0}
```

As shown above, element 5 of the first vector ("first") and element 3 of the second vector ("second") both access array index 6. Therefore, a 3 stored in position 5 of DIV. Likewise, element 6 of first and element 2 of second both access array index position 7, causing a 2 to be stored in position 6 of DIV, and so forth. A zero is stored in the DIV where no data dependencies exist.

In some embodiments, the CheckHazardP instruction may account for various sizes of data types. However, for clarity we describe the function of the instruction using only array index types.

The memory access in the example above has three memory hazards. However, in the described embodiments, only two partitions may be needed to safely process the associated memory operations. More particularly, handling the first hazard on element position 3 renders subsequent dependencies on lower or equally numbered element positions moot. For example:

```
Entry Conditions:      //DIV = {0 0 0 0 3 2 1 0}
                       // p2 = {0 0 0 0 0 0 0 0}
p2 = GeneratePredicates(p2,DIV);   // p2 = {1 1 1 1 0 0 0 0}
P2 = GeneratePredicates(p2,DIV)    // p2 = {0 0 0 0 1 1 1 1}
```

The process used by the described embodiments to analyze a DIV to determine where a vector should be broken is shown in pseudocode below. In some embodiments, the vector execution unit 204 of processor 102 may perform this calculation in parallel. For example:

```
List = <empty>;
for (x=STARTPOS; x<VECLEN; ++x)
{
if(DIV[x] in List)
Break from loop;
else if(DIV[x]>0)
Append <x> to List;
}
```

The vector may safely be processed in parallel over the interval [STARTPOS,x), where x is the position where DIV[x]>0. That is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to partition the vector. There are two methods for dealing with this situation: (1) partitioning loops can be nested; or (2) the DIVs can be combined and used in a single partitioning loop. Either approach yields correct results, but the optimal approach depends on the characteristics of the loop in question. More specifically, where multiple DIVS are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs may be combined using a VectorMax(A,B) instruction as shown below.

```
i2 = CheckHazardP(a,c,p0); //i2 = {0 0 2 0 2 4 0 0}
i3 = CheckHazardP(b,c,p0); //i3 = {0 0 1 3 3 0 0 0}
ix = VectorMax(i2,i3);     //ix = {0 0 2 3 3 4 0 0}
```

Because the elements of a DIV should only contain numbers less than the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 14 is a diagram illustrating one embodiment of example vectorized program code. More particularly, the code sample shown in FIG. 14 is a vectorized version of the code in Example 3 (as presented above). Referring to FIG. 14, no aliasing exists between C[ ] or D[ ] and A[ ], but operations on A[ ] may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists with A[ ], the partitions retain full vector size, and the partitioning loop simply falls through without iterating. However, for iterations where aliasing does occur, the partitioning loop partitions the vector to respect the data dependencies thereby ensuring correct operation.

In the embodiment shown in the code segment of FIG. 14, the hazard check is performed across the entire vector of addresses. In the general case, however, it is often necessary to hazard checks between conditionally executed memory operations. The CheckHazardP instruction takes a predicate that indicates which elements of the second memory operation are active. If not all elements of the first operation are active, the CheckHazardP instruction itself can be predicated with a zeroing predicate corresponding to those elements of the first operand which are active. (Note that this may yield correct results for the cases where the first memory operation is predicated.)

The code segment in Example 4 below illustrates a loop with a memory hazard on array E[ ]. The code segment conditionally reads and writes to unpredictable locations within the array. In FIG. 15 a diagram illustrating one embodiment of example vectorized program code is shown. More particularly, the code sample shown in FIG. 15 is a vectorized Macroscalar version of the code in Example 4 (as presented above).

Example 4

Program Code Loop 4

```
j = 0;
for (x=0; x<KSIZE; ++x)
{
f = A[x];
g = B[x];
if (f < FACTOR)
{
h = C[x];
j = E[h];
}
if (g < FACTOR)
{
i = D[x];
E[i] = j;
}
}
```

Referring to FIG. 15, the vectorized loop includes predicates p1 and p2 which indicate whether array E[ ] is to be read or written, respectively. The CheckHazardP instruction checks vectors of addresses (h and i) for memory hazards. The parameter p2 is passed to CheckHazardP as the predicate controlling the second memory operation (the write).

Thus, CheckHazardP identifies the memory hazard(s) between unconditional reads and conditional writes predicated on p2. The result of CheckHazardP is zero-predicated in p1. This places zeroes in the DIV(ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

It is noted that in the above embodiments, to check for memory-based hazards, the CheckHazardP instruction was used. As described above, the CheckHazardP instruction takes a predicate as a parameter that controls which elements of the second vector are operated upon. However, in other embodiments other types of CheckHazard instructions may be used. In one embodiment, this version of the CheckHazard instruction may simply operate unconditionally on the two input vectors. Regardless of which version of the CheckHazard instruction is employed, it is noted that as with any Macroscalar instruction that supports result predication and/or zeroing, whether or not the a given element of a result vector is modified by execution of the CheckHazard instruction may be separately controlled through the use of a predicate vector or zeroing vector, as described above. That is, the predicate parameter of the CheckHazardP instruction controls a different aspect of instruction execution than the general predicate/zeroing vector described above. The CheckHazard instruction may also be an embodiment of the hazard check instruction previously described.

Numerous variations and modifications will become apparent to those skilled in the art once the above disclosure is fully appreciated. It is intended that the following claims be interpreted to embrace all such variations and modifications.

What is claimed is:

1. A processor comprising:
   a data cache configured to store data from memory;
   an issue circuit coupled to receive a vector memory operation to be executed in the processor, wherein the vector memory operation is derived from a vector instruction in an instruction stream being executed by the processor, wherein the issue circuit is configured to issue the vector memory operation responsive to dependencies on source operands of the vector memory operation resolving; and
   a completion time prediction circuit configured to track one or more aspects of previous executions of the vector memory operation, wherein the completion time prediction circuit is configured to predict a completion time of a current instance of the vector memory operation responsive to the one or more aspects;
   wherein the issue circuit is configured to schedule one or more operations that are dependent on the vector memory operation responsive to the predicted completion time from the completion time prediction circuit, wherein the one or more operations are dependent on data accessed by the vector memory operation for one or more source operands of the one or more operations, wherein the one or more operations are scheduled for execution by the processor; and
   wherein the one or more aspects include a number of cache accesses that occur to the data cache during execution of the vector memory operation.

2. The processor as recited in claim 1 wherein the one or more aspects include a number of memory pages accessed during execution of the vector memory operation.

3. The processor as recited in claim 2 wherein the predicted completion time is based on a larger one of the number of memory pages accessed and the number of cache accesses.

4. The processor as recited in claim 1 wherein the one or more aspects include whether or not the vector memory operation is a cache miss in the data cache.

5. The processor as recited in claim 1 wherein the completion time prediction circuit is configured to filter the one or more aspects responsive to a minimum number of occurrences of each of the one or more aspects.

6. The processor as recited in claim 5 wherein the completion time prediction circuit is configured to predict a maximum likely completion time indicated by the filtered one or more aspects.

7. The processor as recited in claim 1 wherein the completion time prediction circuit is configured to maintain N trackers, where N is a maximum number of pages that are accessible by the vector memory operation, and wherein each of the N trackers is indicative of executions in which a different number of pages, or fewer, were accessed.

8. The processor as recited in claim 1 wherein the completion time prediction circuit is configured to maintain N trackers, where N is a maximum number of cache accesses that can occur for the vector memory operation, and wherein each of the N trackers is indicative of executions in which a different number of cache accesses, or fewer, occurred.

9. A method comprising:
   issuing a vector memory operation for execution in a processor responsive to dependencies on source operands of the vector memory operation resolving, wherein the vector memory operation is derived from a vector instruction in an instruction stream being executed by the processor;
   tracking one or more aspects of previous executions of the vector memory operation, wherein the one or more aspects include a number of cache accesses that occur to a data cache in the processor during execution of the vector memory operation;
   predicting a completion time of the vector memory operation responsive to the one or more aspects; and
   scheduling one or more operations that are dependent on the vector memory operation responsive to the predicted completion time, wherein the one or more operations are dependent on data accessed by the vector memory operation for one or more source operands of the one or more operations, wherein the one or more operations are scheduled for execution by the processor.

10. The method as recited in claim 9 wherein the one or more aspects include a number of memory pages accessed during execution of the vector memory operation.

11. The method as recited in claim 10 wherein the predicted completion time is based on a larger one of the number of memory pages accessed and the number of cache accesses.

12. The method as recited in claim 9 wherein the one or more aspects include whether or not the vector memory operation is a cache miss in the data cache.

13. The method as recited in claim 9 further comprising:
   filtering the one or more aspects responsive to a minimum number of occurrences of each of the one or more aspects; and
   the predicting comprises predicting a maximum likely completion time indicated by the filtered one or more aspects.

14. The method as recited in claim 9 further comprising:
maintaining N trackers, where N is a maximum number of pages that are accessible by the vector memory operation, wherein each of the N trackers is indicative of executions in which a different number of pages, or fewer, were accessed.

15. The method as recited in claim 9 further comprising:
maintaining N trackers, where N is a maximum number of cache accesses that can occur for the vector memory operation, wherein each of the N trackers is indicative of executions in which a different number of cache accesses, or fewer, occurred.

16. A processor comprising:
an issue circuit coupled to receive a vector memory operation to be executed in the processor, wherein the vector memory operation is derived from a vector instruction in an instruction stream being executed by the processor, wherein the issue circuit is configured to issue the vector memory operation responsive to dependencies on source operands of the vector memory operation resolving; and
a completion time prediction circuit configured to track one or more aspects of previous executions of the vector memory operation, wherein the completion time prediction circuit is configured to predict a completion time of the vector memory operation responsive to the one or more aspects;
an address generation unit coupled to receive the source operands and configured to generate the addresses of the elements of the vector memory operation;
a translation lookaside buffer coupled to the address generation unit and configured to translate the addresses; and
a data cache coupled to the address generation unit and the translation lookaside buffer, and wherein the data cache is configured to store data from memory;
wherein the completion time prediction circuit is coupled to receive indications of a number of pages accessed by the vector memory operation from the translation lookaside buffer and a number of cache access by the vector memory operation from the data cache to update the one or more aspects tracked by the completion time prediction circuit; and
wherein the issue circuit is configured to schedule one or more operations that are dependent on the vector memory operation responsive to the predicted completion time from the completion time prediction circuit, wherein the one or more operations are dependent on data accessed by the vector memory operation for one or more source operands of the one or more operations, wherein the one or more operations are scheduled for execution by the processor.

17. The processor as recited in claim 16 wherein the predicted completion time is based on a larger one of the number of memory pages accessed and the number of cache accesses.

18. The processor as recited in claim 16 wherein the one or more aspects include whether or not the vector memory operation is a cache miss in the data cache.

19. The processor as recited in claim 16 wherein the completion time prediction circuit is configured to maintain N trackers, where N is a maximum number of pages that are accessible by the vector memory operation, and wherein each of the N trackers is indicative of executions in which a different number of pages, or fewer, were accessed.

20. The processor as recited in claim 16 wherein the completion time prediction circuit is configured to maintain N trackers, where N is a maximum number of cache accesses that can occur for the vector memory operation, and wherein each of the N trackers is indicative of executions in which a different number of cache accesses, or fewer, occurred.

* * * * *